Patented Mar. 10, 1925.

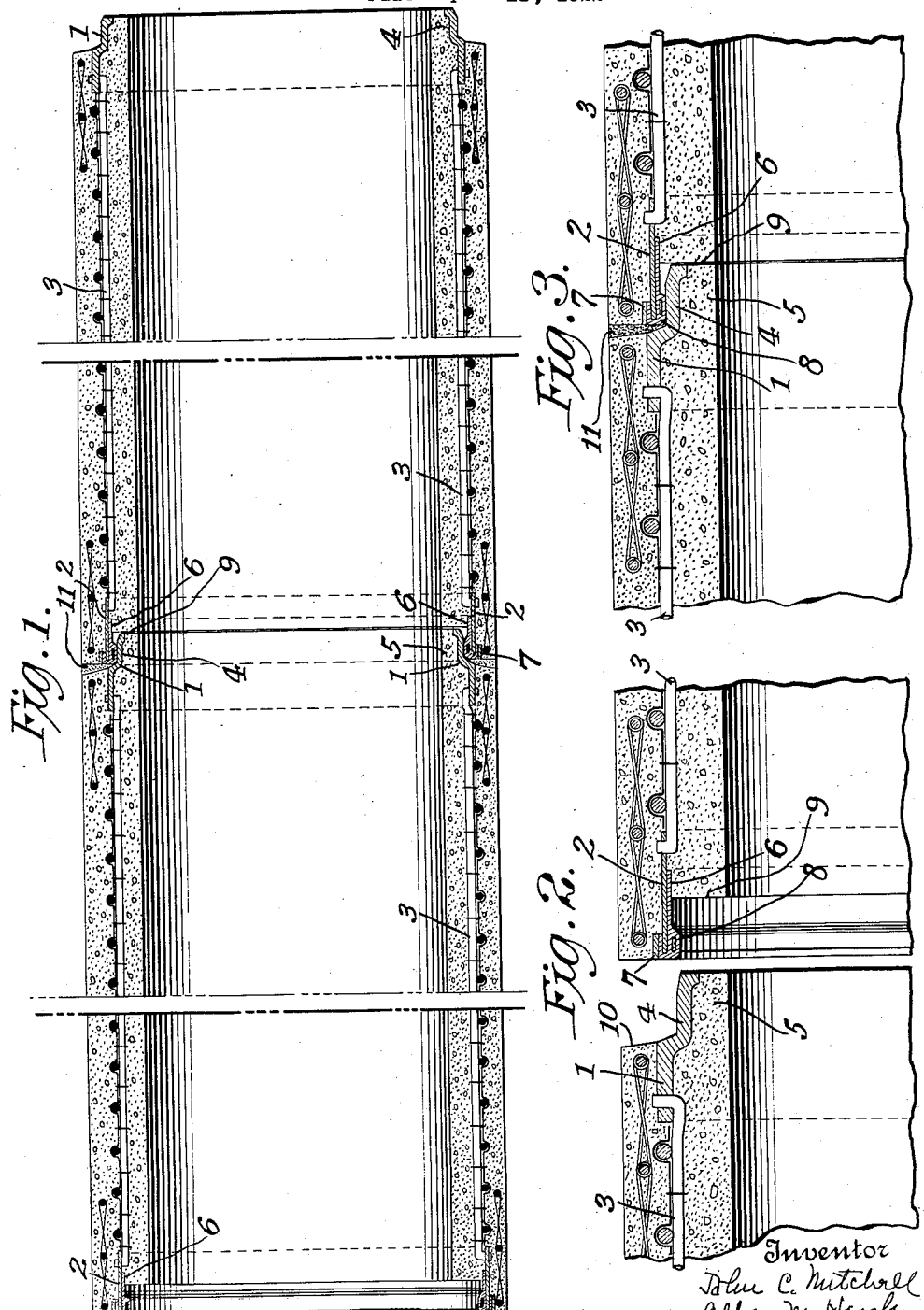

1,529,495

UNITED STATES PATENT OFFICE.

JOHN C. MITCHELL, OF EAST ORANGE, AND ALLAN M. HIRSH, OF MONTCLAIR, NEW JERSEY, ASSIGNORS TO LOCK JOINT PIPE COMPANY, OF AMPERE, NEW JERSEY, A CORPORATION OF NEW JERSEY.

JOINT FOR CONCRETE PRESSURE PIPES.

Application filed April 18, 1922. Serial No. 554,447.

*To all whom it may concern:*

Be it known that we, JOHN C. MITCHELL and ALLAN M. HIRSH, residing, respectively, at East Orange, county of Essex, and State of New Jersey, and Montclair, county of Essex and State of New Jersey, being citizens of the United States, have invented certain new and useful Improvements in Joints for Concrete Pressure Pipes, of which the following is a full, clear, and exact description.

In the making of concrete pressure pipes it has heretofore been customary to integrally mold in the ends of the abutting pipe sections hard metal telescoping cylinders, and to give to the cylinders in the spigot ends such diameter and conformation that a lead or equivalent packing or gasket laid in the bell cylinder would be compressed between the two opposing surfaces of the cylinders, when the sections were assembled and thus form a tight joint between them.

In all previous cases, however, the packing or gasket has been separable from the cylinders and laid in before the two sections were assembled, from which, it has been found in practice, that an imperfectly tight joint was likely to be formed by the displacement or distortion of the gasket by the relative movement of the two cylinders.

To obviate this objection we have now devised a form of concrete pressure pipes in which the packing or gasket is made an integral part of one section of pipe, so as to be fixed in position therein and necessarily, therefore, flattened or compressed properly by the assembly of two sections to form a tight and perfect joint. This improved joint forms the subject of our present application for Letters Patent.

The new joint is illustrated in the accompanying drawings in which:—

Fig. 1 is a longitudinal central section of a length of pipe containing the joint.

Fig. 2 is a sectional view on an enlarged scale of portions of two abutting pipe sections before assembly, and Fig. 3 is a similar view of the two sections after assembly.

The pipe to which the invention is applicable is a reinforced concrete pipe of any known or suitable character. It is molded in sections and in each end is a cylinder of iron or steel 1 or 2, integrally molded therein, the cylinders being connected by longitudinal reinforcing bars or rods 3, in the usual manner.

The spigot end of a section contains a cylinder 1 of somewhat less diameter than the complete pipe, and formed with a projecting portion 4 of smaller diameter, which overlies the concrete spigot or part 5 of reduced diameter. The end of the part 4 is tapered slightly, as shown.

The bell end of the pipe contains a steel cylinder 2 of slightly greater internal diameter than the cylinder 4. Before the pipe section is molded around this cylinder a lead covering 6, generally and preferably in the form of a complete cylinder, is passed into the cylinder 2 with its end projecting therefrom. This end is then turned over, by any suitable tool, to overlie the free end of the cylinder, and preferably a ring of steel 7 may then be forced over the edge.

The lead covering is formed with an enlargement 8, containing in an opening therein some compressible material such as is used in ordinary lead gaskets or packings, and this enlargement, which constitutes in effect a fixed gasket, is near the end of the bell cylinder.

When the sections of this pipe are assembled, the spigot cylinder end is forced home in the bell end. The inclined surface at the end of the spigot cylinder passes over the fixed gasket 8, which, by the plain portion 4, is then compressed to form a perfectly tight joint between the two cylinders. The spigot is forced into the bell until its end lies approximately against the shoulder 9, in the bell end, as shown in Fig. 3.

The shoulder 10 of the spigot is slightly inclined backward so that when the two sections are fully united a small open space is left around the exterior of the pipe between the two sections. This space is then filled up with cement as shown at 11.

By the construction described, all the care and precautions necessary for making a tight joint by the compression of a gasket or packing interposed between the two telescoping ends of pipe sections as heretofore practiced, are entirely avoided. The sections carry the gaskets as an integral part of the same, and they are therefore fixed in their proper position, and are necessarily compressed to form a tight joint when the spigot end is inserted.

The specific means herein shown for compressing this gasket, is not of the essence of the invention and may be greatly varied. The only necessary point is that the gasket should be in a position or relation to the pipe which will preclude its being displaced or blown out by internal pressure, and as a matter of fact in the pipe shown, the higher this pressure the tighter the fit of the gasket will be.

What we claim as our invention is:

1. A joint for concrete pressure pipes comprising, in combination, metal cylinders molded into the bell and spigot ends of the sections and of such relative diameters that those of abutting sections telescope, a sheet of lead permanently and immovably secured to one cylinder and having integral therewith a gasket or packing which is compressed by the assembly of two sections to form a tight joint.

2. A joint for concrete pressure pipes comprising in combination, metal cylinders integrally molded into the bell and spigot ends of the sections, the spigot cylinder being of a diameter to telescope with the bell cylinder when the sections are assembled, and a casing of soft metal such as lead, for the interior of the bell cylinder, and attached thereto and having integral therewith a gasket or packing which is compressed by the spigot cylinder to form a tight joint where the two sections of pipe are assembled.

3. A joint for concrete pressure pipes comprising in combination, metal cylinders integrally molded into the bell and spigot ends of the sections, the spigot cylinder being of a diameter to telescope with the bell cylinder when two sections are assembled, and a sheet lead covering for the interior and free end of the bell cylinder, and attached thereto and having integral therewith a packing or gasket which is compressed to form a tight joint by the introduction of the spigot into the bell cylinder.

In testimony whereof we hereto affix our signatures.

JOHN C. MITCHELL.
ALLAN M. HIRSH.